Nov. 24, 1936.  E. J. DONDLINGER  2,062,120
TRANSPORT VEHICLE CONSTRUCTION
Filed March 7, 1936   2 Sheets-Sheet 1
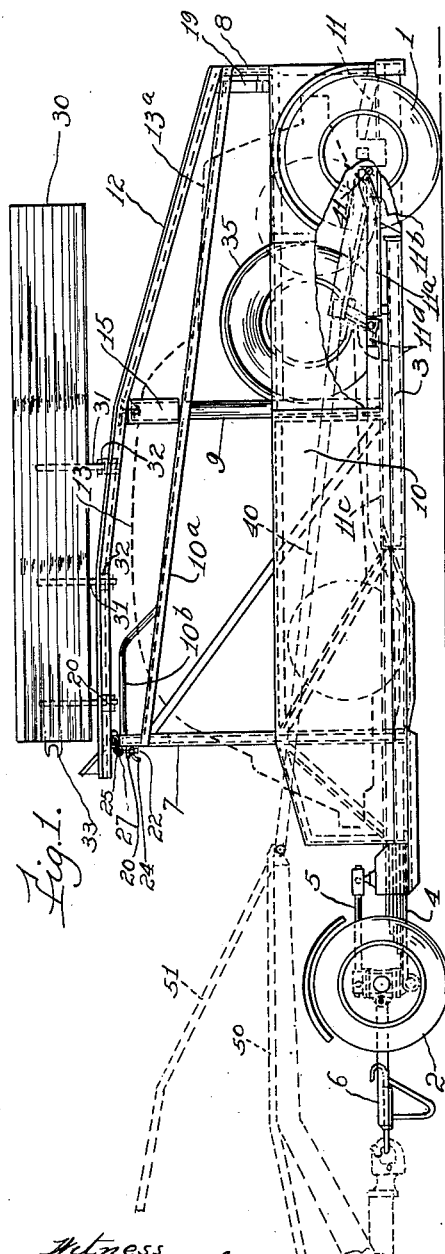
Inventor:
Eugene J. Dondlinger
by [signature]
his Attorneys.

Nov. 24, 1936.  E. J. DONDLINGER  2,062,120
TRANSPORT VEHICLE CONSTRUCTION
Filed March 7, 1936  2 Sheets-Sheet 2
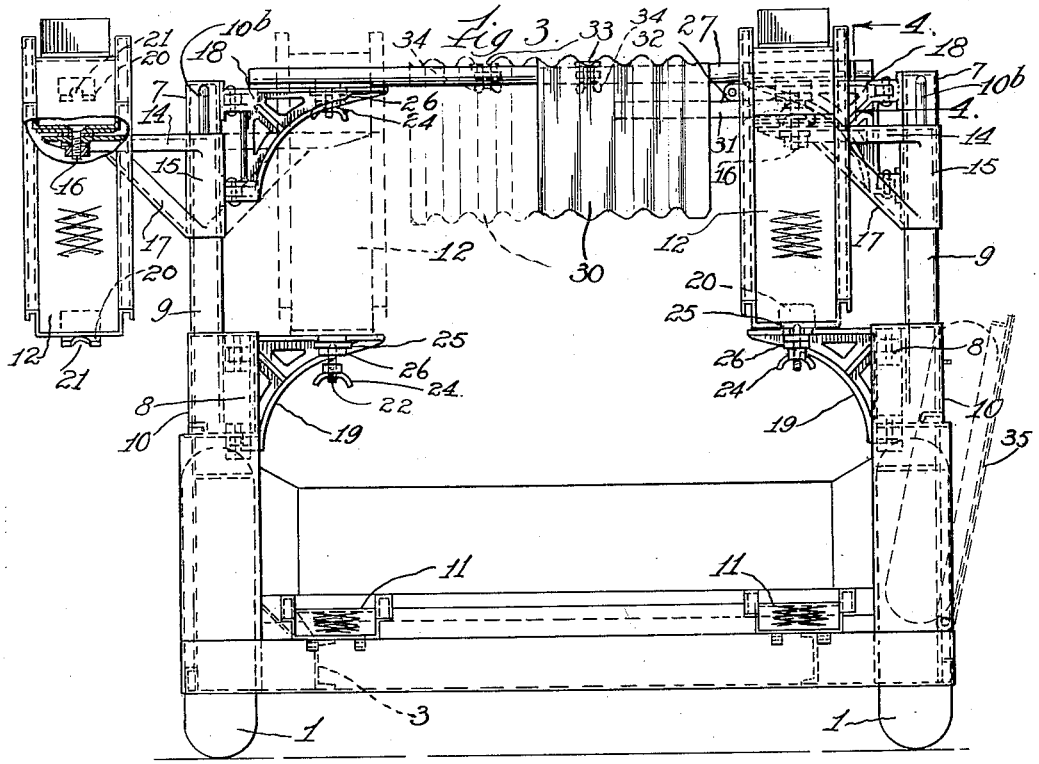
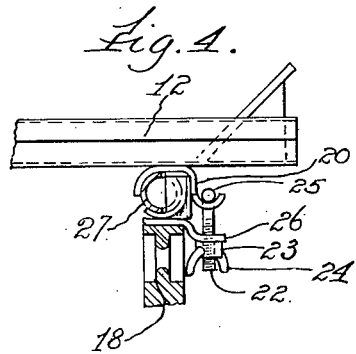
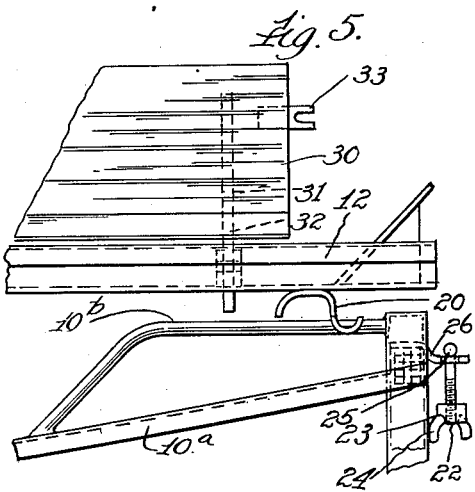
Witness
L. F. McKnight
Inventor:
Eugene J. Dondlinger
by Burton & Burton
his Attorneys.

Patented Nov. 24, 1936

2,062,120

UNITED STATES PATENT OFFICE 2,062,120

TRANSPORT VEHICLE CONSTRUCTION

Eugene J. Dondlinger, Chicago, Ill.

Application March 7, 1936, Serial No. 67,591

16 Claims. (Cl. 296—1)

This invention relates to a wheeled conveyance of the type designed for carrying motor vehicles, such as automobiles, over the highways, usually in transporting such vehicles from the factory to a salesroom. The conveyances may be in the nature of motor trucks or trailers to be drawn by motor trucks, and the conveyance shown herein for the purpose of illustrating the invention is indicated as a trailer. The object of the invention is to provide means for accommodating more than one vehicle to be transported in a relatively compact arrangement on the conveyance, and to arrange such means adjustably with relation to the frame of the conveyance to facilitate loading and unloading of the vehicles carried thereby. More specifically, the object embraces the provision of a track to support one vehicle above another, the track being so formed that in its operative position it would interfere with loading or unloading the lower vehicle, but being adjustably carried on the conveyance in such a way that it may be readily shifted out of interfering position. The invention consists of certain elements of construction in combination as herein shown and described and as indicated by the claims.

In the drawings:

Figure 1 is a side elevation of a conveyance in the nature of a trailer, embodying this invention.

Figure 2 is a top plan view of the vehicle-carrying portion of the trailer,—the front wheels of the trailer being omitted,—the upper set of carrying tracks being shifted out of operative position.

Figure 3 is a rear elevation of the conveyance showing one of the upper carrying tracks shifted out of operative position and with certain details shown in section.

Figure 4 is a detail section taken as indicated at line 4—4 on Figure 3.

Figure 5 is a fragmentary detail elevation showing a part of an oil pan swung to inoperative position and the end portion of one track, detached from the frame, but guided thereon in the process of being shifted to its inoperative position.

Figure 6 is a detail perspective view showing the lower tracks adjusted in position for loading the tractor.

The trailer vehicle shown in the drawings includes rear wheels, 1, and front wheels, 2, the latter being dirigibly connected to the main frame, 3, by means of a spring, 4, and drag link, 5. A draw-bar, 6, is provided for coupling the trailer to any suitable tractor vehicle which may or may not be arranged for carrying automobiles in addition to those carried by the trailer.

The trailer frame includes side frames having uprights, 7 and 8, adjacent its front and rear ends respectively and special tubular uprights, 9, each disposed about mid-way of the length of the side frame. Additional framing members, including side plates, 10, serve to stiffen and reinforce the uprights. The main frame, 3, carries a pair of lower tracks, 11, 11, and the side frames support a pair of upper track members, 12, 12, so that at least two automobiles may be carried on the conveyance, one above the other. In their normal operative position the upper tracks, 12, are registered directly over the lower tracks, 11, and the rear end portions of said upper tracks, 12, are bent downwardly, as seen in Figure 1, following the general contour of an automobile spanning on the lower tracks, 11, such as is indicated in broken outline at 13. As represented, the motor vehicle faces rearwardly, so that the downwardly bent portions of the upper tracks, 12, trend close to the hood and radiator outline of the vehicle at 13ª. This permits loading a second vehicle on the tracks, 12, facing in the opposite direction, and considerably reduces the over-all height of the load as compared with what it would be if the upper tracks were level. Owing to the bent formation of the tracks, 12, it would be impossible to move the vehicle outlined at 13, rearwardly, or to have it loaded onto the lower tracks, 11, from the rear of the trailer if the tracks, 12, were left in their normal position directly above the tracks, 11. Therefore, I have provided a special mounting for these upper tracks, permitting them to be shifted at will to facilitate loading the lower tracks, 11, or unloading them.

Each of the tracks, 12, is carried on a crank arm, 14, projecting horizontally from a tubular member, 15, to which it is rigidly attached, and which, itself, is telescopically fitted onto the upper end of one of the uprights, 9, so that the arm, 14, may rotate about the vertical axis of the upright. At a distance from this axis the arm is pivotally attached to the under side of the track, 12, by a pivot bolt, 16, extending vertically and thus parallel to the axis upon which the arm may swing. A diagonal brace, 17, is seen in Figure 3, connecting the lower portion of the tube, 15, to the arm, 14, to stiffen and strengthen it for carrying the track, 12, and any load resting thereon. Each of the side frames includes a top rail, 10ª, clearly seen in Figure 1, extending obliquely downward from the front upright, 7, to the rear upright, 8, and rigidly secured to this member, as by welding, is a guide rod, preferably of round stock, seen at 10ᵇ, and extending above the member, 10ᵃ, and substantially horizontal for some distance rearwardly of the upright, 7, then trending obliquely downward for attachment to the member, 10ᵃ. The purpose of these guides, 10ᵇ, will be presently explained more fully.

Swinging brackets, 19, are pivoted to the upright, 7, and swinging brackets, 19, are similarly pivoted to the uprights, 8, for additionally supporting the tracks, 12. Each of the tracks, 12, carries a downwardly bent slotted clip, 20, on its under side adjacent each end, with its slot, 21, opening toward the end of the track with which it is associated. The slotted portion is hooked or curved upwardly to form a cradle for the T head of a bolt, 22, provided with a nut, 23, with wings or arms, 24, to facilitate its adjustment without the use of tools. The bolts, 22, thus serve to hold the ends of the track, 12, in position when said bolts extend through the apertures, 25, in plates or clips, 26, projecting from the faces of the respective brackets, 18 and 19, as seen, for example, in Figure 1, at the forward side of the upright, 7.

For shifting either of the tracks, 12, laterally outward to provide proper clearance between them in loading an automobile onto the lower tracks, 11, or removing it therefrom, the wing nuts, 23, at each end of the track, 12, are loosened sufficiently to permit lifting the T heads of the bolts, 22, out of the slotted cradles in the clips, 20. The bolts are then dropped down to hang loosely from the clips, 26, as seen in Figure 5. This allows the brackets, 18 and 19, to be swung back into positions parallel to the side frames, as seen in Figure 2, leaving the track, 12, substantially balanced upon the crank arm, 14.

By grasping the rear end of the track the operator may then move it backward and tilt it just enough to engage the slotted clip, 20, at the forward end with the guide rod, 10ᵇ, straddling the rod, as seen in Figure 5. A further backward movement draws the clip along the guide, 10ᵇ, while rotating the crank arm rearwardly; then, using the engagement of the clip, 20, with the rod, 10ᵇ, to provide a fulcrum, the operator may swing the rear end of the track outwardly to cause continued rotation of the crank arm, 14, toward its extreme position about as shown for the left-hand track in Figure 2. The last step consists in tilting the track again to free the clip from the rod, 10ᵇ, so as to permit swinging the track about its pivot, 16, into a position parallel to the side frame and to the track, 11, as in Figure 2. Thus it will be seen that the provision of the guide rods, 10ᵇ, greatly facilitates the manipulation of the tracks and allows them to be handled easily by a single operator, without help.

At the forward end the brackets, 18, are tied together when in operative position by means of a tubular cross-beam, 27, which may be permanently fixed to one of the brackets and disengageably lodged on the other, so that when the brackets are swung into positions parallel to the side frames, said cross-beam, 27, will swing with the bracket to which it is attached, and will extend as shown in Figure 2.

Preferably, to protect the vehicle on the lower tracks, 11, from any oil or grease which might drip from the vehicle carried on tracks, 12, I provide the upper tracks with drip pans, 30, each dimensioned to extend for about one half the width between the tracks in their operative position, and each bent to conform approximately to the oblique trend of the tracks, 12. As shown, these pans are constructed of corrugated sheet metal, and are supported by means of arms, 31, secured by hinge fittings, 32, to the respective tracks 12, so that the arms, 31, may project horizontally when the pans are in use, and the pans may be supported at the forward end by resting upon the cross-beam, 27. At this end the pans may be provided with slotted clips, 33, engageable by bolts, 34, carried on the beam, 27, as indicated in Figures 3 and 5, so that they may be readily released and folded upward into vertical position, as seen in Figure 1, in preparation for the shifting of the tracks, 12, to their inoperative positions laterally outside the side frames. If desired, a single drip pan may be employed instead of providing two sections as illustrated, and such single pan will be normally positioned in the middle of the space between the tracks, 12, and may be hinged to one of them by suitable supporting arms which, if desired, may extend across the space bridging the gap and resting upon the edge of the opposite track or upon any convenient fitting provided thereon for lodgment of such arms. Such a single pan will be manipulated in the same manner as the two-section pan already described; that is, it may be swung into a vertical position preparatory to shifting the track, 12, outwardly to widen the clearance space between the upper tracks.

When the upper tracks, 12, have been shifted laterally to provide ample clearance space between them, and the drip pan or pans have been turned upwardly for the same purpose, it is possible to drive an automobile between the side frames of the trailer onto the rear-end portions of the tracks, 11, and along a pair of temporary ramps indicated at 40 in Figure 1 as being inclined upwardly to connect with either the lower track, 50, of the tractor vehicle or the inclined loading ramp, 51, which leads to an upper track thereon. These parts of the tractor are shown in broken outline in Figure 1, and may be understood as similar to the structure shown more fully in my co-pending application Serial No. 30,812, filed July 11, 1935. As seen in Figures 1 and 2, each of the lower tracks, 11, includes a short section, 11ᵃ, hinged at 41 just ahead of the rear axle and then formed with a slight downward dip at 11ᵇ. The connecting sections, 11ᶜ, are provided with hinged terminals, 11ᵈ, which normally lie flat upon the tracks, but which may be swung upwardly about their hinges to serve as struts to support the sections, 11ᵃ, in inclined position, as shown in Figure 1, so that the removable ramp sections, 40, may extend between the upraised ends of the tracks, 11ᵃ, and the rear end of the tractor. In this upraised position the parts of the tracks, 11ᵃ, adjacent their hinged ends are rendered substantially horizontal, which facilitates moving the automobile upward along them and along the ramp sections, 40. When the tractor vehicle has been loaded, the ramps, 40, are removed and the track sections, 11ᵃ, together with the bracing struts, 11ᵈ, are folded down into position to receive an automobile on the lower tracks of the trailer. And, finally, the upper tracks, 12, are shifted back into their load-carrying position and the ramps, 40, are attached to the downwardly sloping rear ends of the tracks, 12, for moving an automobile onto them.

I claim:

1. In a wheeled conveyance for motor cars and the like, in combination, a frame including a super-structure comprising a pair of transversely spaced side frames, a pair of transversely spaced vehicle-supporting tracks, and means by which said tracks are carried on the respective side frames comprising arms extending in a substantially horizontal plane and each connected to one of the side frames for rotation about a vertical axis, together with a vertical pivot by which the arm is connected to the track at a distance from said vertical axis, whereby each of the tracks may be shifted laterally from one position into a substantially parallel position by rotating the arm about the said vertical axis.

2. In a wheeled conveyance for motor cars and the like, in combination, a frame including a super-structure comprising a pair of transversely spaced side frames, a pair of transversely spaced vehicle-supporting tracks, and means by which said tracks are carried on the respective side frames comprising arms extending in a substantially horizontal plane and each connected to one of the side frames for rotation about a vertical axis, together with a vertical pivot by which the arm is connected to the track at a distance from said vertical axis and approximately at the midpoint of the track, and means adjacent the ends of the side frame for detachably securing the respective end portions of the track in vehicle-supporting position.

3. In a wheeled conveyance for motor cars and the like, in combination, a frame including a super-structure comprising a pair of transversely spaced side frames, a pair of transversely spaced vehicle-supporting tracks, and means by which said tracks are carried on the respective side frames comprising arms extending in a substantially horizontal plane and each connected to one of the side frames for rotation about a vertical axis, a vertical pivot by which the arm is connected to the track at a distance from said vertical axis intermediate the ends of the track, and brackets pivotally attached to the side frame adjacent its ends, and means for securing the end portions of the track to said brackets respectively, the brackets when detached being movable to positions laterally outward from their track-supporting positions for widening the space between them.

4. In the combination defined in claim 3, the means for securing each end of the track to one of the brackets comprising a headed bolt, an apertured clip on the bracket, the bolt being captive in the aperture of the clip, and a clip on the track having an open slot to receive the headed end of the bolt.

5. In a wheeled conveyance for automobiles and the like, a frame, longitudinally extending lower tracks carried by and near the bottom of the frame for supporting an automobile to be carried, a pair of longitudinally extending upper tracks spaced above the lower tracks for supporting another automobile to be carried above the first automobile, said upper tracks being of rigid construction and extending substantially the full length of the frame, and means connecting each of said upper tracks to the frame comprising a fixed upright member, a crank arm journaled on said upright and extending horizontally therefrom for rotation about a vertical axis, and a pivotal connection between said crank arm and the track whereby the track may be shifted laterally from its normal position above the lower track when said crank arm is rotated.

6. In a wheeled conveyance for automobiles and the like, a frame, longitudinally extending lower tracks carried by and near the bottom of the frame for supporting an automobile to be carried, a pair of longitudinally extending upper tracks spaced above the lower tracks for supporting another automobile to be carried above the first automobile, said upper tracks being of rigid construction and extending substantially the full length of the frame, and means movably supporting each of said upper tracks on the frame including means guiding the upper track in translation laterally outward from its position above the lower track into an approximately parallel position for widening the space between the upper tracks.

7. In a wheeled conveyance for automobiles and the like, a frame, longitudinally extending lower tracks carried by and near the bottom of the frame for supporting an automobile to be carried, a pair of longitudinally extending upper tracks spaced above the lower tracks for supporting another automobile to be carried above the first automobile, said upper tracks being of rigid construction and extending substantially the full length of the frame, and means movably connecting each of said upper tracks to the frame comprising a fixed upright cylindrical member, a sleeve telescopically fitted over the top of said member to rotate thereon, a bracket carried by the said sleeve including a horizontal arm and a pivotal connection between said arm and the track whereby the track may be shifted laterally from its normal position above the lower track when said arm and sleeve are rotated upon the upright member.

8. In a wheeled conveyance for automobiles and the like, a frame, longitudinally extending lower tracks carried by and near the bottom of the frame for supporting an automobile to be carried, a pair of longitudinally extending upper tracks spaced above the lower tracks for supporting another automobile to be carried above the first automobile, said upper tracks being of rigid construction and extending substantially the full length of the frame, and portions thereof being bent downwardly out of a flat plane to such an extent that when in vehicle-supporting position said portions interfere with moving an automobile along the lower tracks, and means connecting each of said upper tracks to the frame comprising a fixed upright member, a crank arm journaled on said upright and extending horizontally therefrom for rotation about a vertical axis, and a pivotal connection between said crank arm and the track whereby the track may be shifted laterally from its normal position above the lower track when said crank arm is rotated.

9. In the combination defined in claim 2, cooperating guide means on the track and side frame adjacent one end and engageable throughout the rotative adjustment of said horizontal arm, said guide means serving to provide a fulcrum for manipulating the track from the opposite end in a manner to cause rotation of the arm.

10. In the combination defined in claim 2, a longitudinally extending guide rail on the side frame adjacent one end, a cooperating bifurcated guide member secured to the corresponding end of the track and adapted to ride on said rail throughout the rotative adjustment of the said horizontal arm to provide a fulcrum for manipulating the track from the opposite end in a manner to cause rotation of the arm.

11. In the combination defined in claim 2, cooperating guide means on the track and side frame adjacent the forward and upper end of the track, said guide means being engageable substantially throughout the rotative adjustment of said horizontal arm by which the track is shifted outwardly, whereby said guide means provides a fulcrum for manipulation of the track from its lower end to cause rotation of the arm.

12. In a wheeled conveyance for automobiles and the like, a frame, longitudinally extending lower tracks carried by and near the bottom of the frame for supporting an automobile to be carried, a pair of longitudinally extending upper tracks spaced above the lower tracks for supporting another automobile to be carried above the first automobile, means movably supporting each of said upper tracks on the frame including means guiding the upper track in translation horizontally outward from its position above the lower track into a substantially parallel position without material lifting of the track.

13. In a wheeled conveyance for automobiles and the like, a frame, longitudinally extending lower tracks carried by and near the bottom of the frame for supporting an automobile to be carried, a pair of longitudinally extending upper tracks spaced above the lower tracks for supporting another automobile to be carried above the first automobile, means movably connecting each of said upper tracks to the frame adapted to permit each track to be shifted laterally outward from its position above the lower track into a substantially parallel position, together with a drip pan associated with each upper track hingedly attached to said track adjacent its inner lateral edge for projection horizontally toward the other track and adapted to be swung about its hinged connection upwardly into a plane adjacent said inner lateral edge of said track, and to be shifted laterally therewith to increase the clearance space between the upper tracks.

14. In a wheeled conveyance for motor cars and the like, in combination, a frame, longitudinally extending lower tracks carried by and near the bottom of the frame for supporting a motor car to be carried, a super-structure comprising a pair of transversely spaced side frames, a pair of longitudinally extending upper tracks spaced above the lower tracks for supporting another motor car to be carried above the first, means movably supporting said upper tracks adapted to permit shifting them laterally into positions substantially parallel to their normal load-carrying positions for widening the clearance space between said upper tracks, and a drip pan normally carried in the space between said upper tracks and hingedly connected to the inner lateral edge of one of them for swinging upwardly about the axis of such hinged connection to be shifted laterally outward with the track to which it is attached.

15. In a wheeled conveyance for motor cars and the like, a frame and a pair of transversely spaced vehicle-supporting tracks thereon, each track including a hinged section adapted to be swung into inclined position and an adjoining track section with a hinged terminal adapted to be swung into position to brace the inclined section.

16. In a wheeled conveyance for motor cars and the like, a frame and a pair of transversely spaced channels serving as vehicle supporting tracks on said frame, each track including a hinged section adapted to be swung into inclined position and an adjoining track section with a hinged terminal of channel shape adapted to be swung into position to brace the inclined section and to fit within the channel track when swung out of bracing position.

EUGENE J. DONDLINGER.